US006693728B1

United States Patent
Kinoshita et al.

(10) Patent No.: US 6,693,728 B1
(45) Date of Patent: Feb. 17, 2004

(54) RECORDING APPARATUS (75) Inventors: Hiroyuki Kinoshita, Kawasaki (JP); Takao Nakamura, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/562,140

(22) Filed: May 1, 2000

(30) Foreign Application Priority Data

| May 11, 1999 | (JP) | ............................................. 11-129914 |
| Jun. 2, 1999 | (JP) | ........................................... 11-154895 |
| Jul. 19, 1999 | (JP) | ........................................... 11-204797 |

(51) Int. Cl.⁷ ............................. H04N 1/21; H04N 1/23
(52) U.S. Cl. ...................... 358/296; 358/296; 358/498; 358/496
(58) Field of Search ................................ 358/296, 496, 358/407, 442, 498, 400; 347/104, 3

(56) References Cited

U.S. PATENT DOCUMENTS

| 4,814,792 A | * | 3/1989 | Yamanobe et al. ......... 347/248 |
| 5,218,446 A | * | 6/1993 | Sobue ........................ 358/296 |
| 5,534,894 A | * | 7/1996 | Hirano et al. ................ 346/134 |
| 5,580,042 A | | 12/1996 | Taniguro et al. ............. 271/274 |
| 5,620,174 A | | 4/1997 | Taniguro et al. .......... 271/10.12 |
| 5,672,019 A | | 9/1997 | Hiramatsu et al. .......... 400/624 |
| 5,725,319 A | | 3/1998 | Saito et al. ................. 400/629 |
| 5,731,885 A | * | 3/1998 | Nagahara .................... 358/496 |

* cited by examiner

*Primary Examiner*—Edward Coles
*Assistant Examiner*—Heather D. Gibbs
(74) *Attorney, Agent, or Firm*—Fitzpatrick, Cella, Harper & Scinto (57) ABSTRACT

The present invention relates to a recording apparatus provided with recording device for effecting recording on a sheet which has sheet containing device provided detachably attachably to a main body of the apparatus, sheet supporting device disposed in the sheet containing device, for supporting the sheet, lift device for lifting the sheet supporting device from the sheet containing device in operative association with an operation of attaching the sheet containing device to the main body of the apparatus, and sheet feeding device for feeding the sheet from the sheet feeding device for feeding the sheet from the sheet supporting device lifted by the lift device toward the recording device.

19 Claims, 10 Drawing Sheets

RECORDING APPARATUS

BACKGROUND OF THE INVENTION

1. Field of the Invention

This invention relates to a recording apparatus for recording an image on a sheet.

2. Related Background Art

A compound machine having an image scanner (hereinafter referred to as the scanner), a facsimile apparatus or the like as image reading means added to a recording apparatus (hereinafter referred to as the printer) for recording characters and image information outputted from an information processing apparatus such as a computer on a sheet which is a recording medium such as paper or a plastic sheet, and given the copying function, etc. is called multifunction peripheral (hereinafter referred to as the MFP). In the MFP, a region in which the printer effects recording on the sheet is called a printer portion, and a region in which the scanner effects image scanning is called a scanner portion.

In the MFP, as compared with using apparatuses such as the printer and the scanner which are separate, there are advantages of lower labor since the apparatuses are combined and that the MFP is also excellent in an operation wherein the respective functions are connected together.

Recording means of various recording types such as the ink jet type, the wire dot type, the thermal type and the laser beam type are applicable as the printer used in the MFP. Also, the auto sheet feeder type or the feeding sheet cassette type is used as setting means for sheets on which recording is effected by the printer.

As the types of the scanner used in the MFP, there are the sheet feed type, the flat bed type, the cartridge type attached to the recording head portion of a printer of the ink jet type, etc.

In an apparatus using the scanner of the cartridge type attached to the recording head portion, there is the problem that recording and reading cannot be effected at the same time because a recording head is used, and the scanner of the sheet feed type is problematic because it can handle only cut sheet (single sheet) shaped originals and is unsuitable for book originals or the like.

Also, the scanner of the flat bed type is free from the problems as noted above, but requires a wide installation area, and when the auto sheet feeder type is combined with the setting means for sheets used in the printer, it is necessary to effect the setting of the sheets across the scanner from the rear portion of the apparatus and therefore, operability may become bad in some cases.

SUMMARY OF THE INVENTION

The present invention has been made in order to solve the above-noted problems peculiar to the prior art, and the object thereof to provide a recording apparatus which is simple in construction, good in operability, low in cost, high in reliability and compact.

The present invention provides a recording apparatus provided with recording means for effecting recording on a sheet, characterized by:

sheet containing means provided detachably attachably to the main body of the apparatus;

sheet supporting means disposed in the sheet containing means, for supporting the sheet;

first guide means provided in the main body of said apparatus, for lifting a tip end portion in an attachment direction of said sheet supporting means from said sheet containing means in operative association with an operation of attaching said sheet containing means to the main body of said apparatus;

second guide means provided in said sheet containing means, for lifting a rear end portion of said sheet supporting means by the operation of attaching said sheet containing means; and sheet feeding means for feeding the sheet from the sheet supporting means lifted by the lift means toward the recording means.

DESCRIPTION OF THE PREFERRED EMBODIMENT

A preferred embodiment of this invention will hereinafter be described in detail with reference to the drawings. However, the dimensions, materials, shapes, relative dispositions, etc. of constituent parts described in this embodiment, unless specifically specified, are not intended to restrict the scope of this invention thereto. Also, the constructions described in the prior art need not be described.

Figure 1:
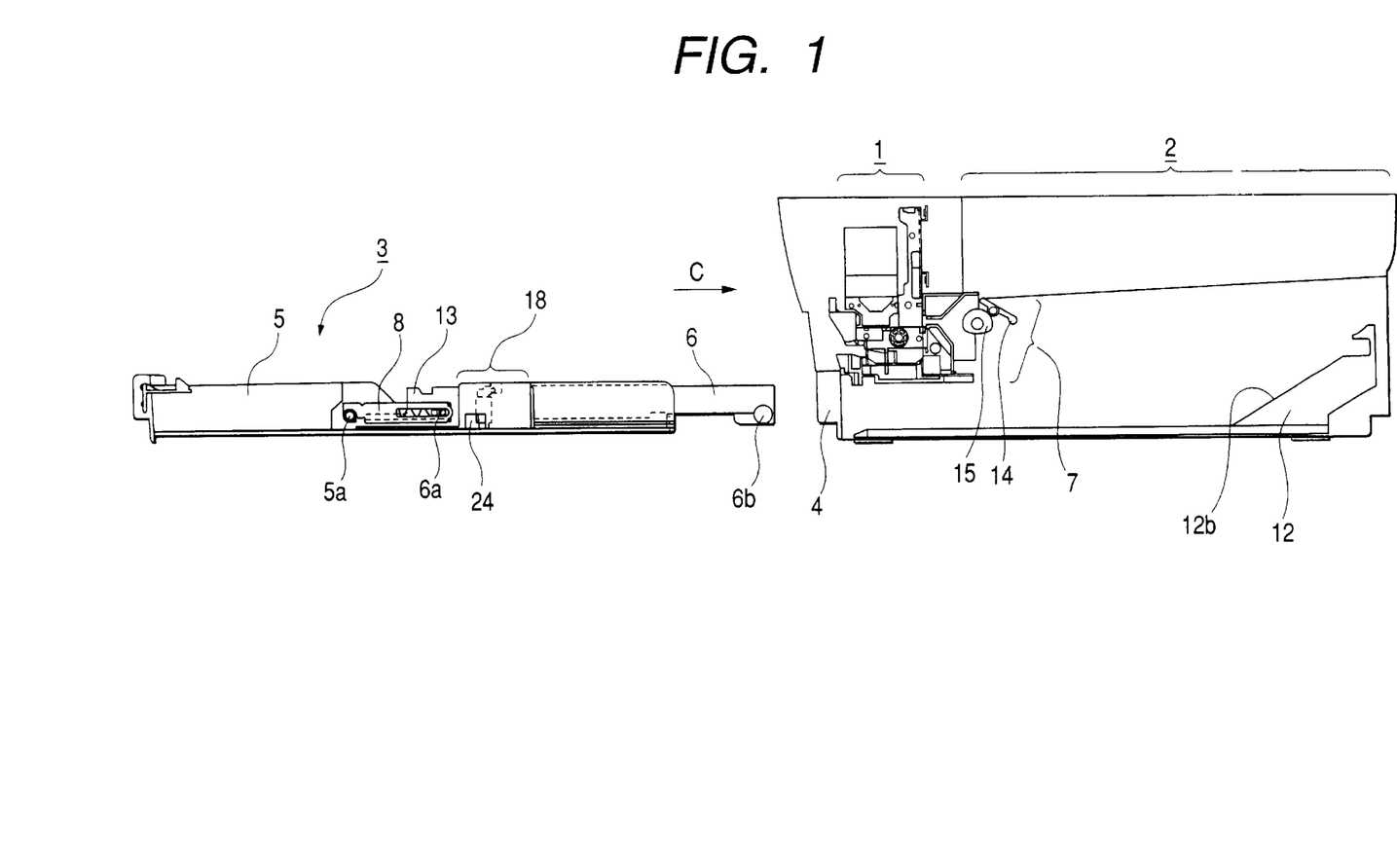
FIG. 1 is a cross-sectional view showing MFP in a state in which a sheet cassette in an embodiment of the present invention has been pulled out.
Figure 2:
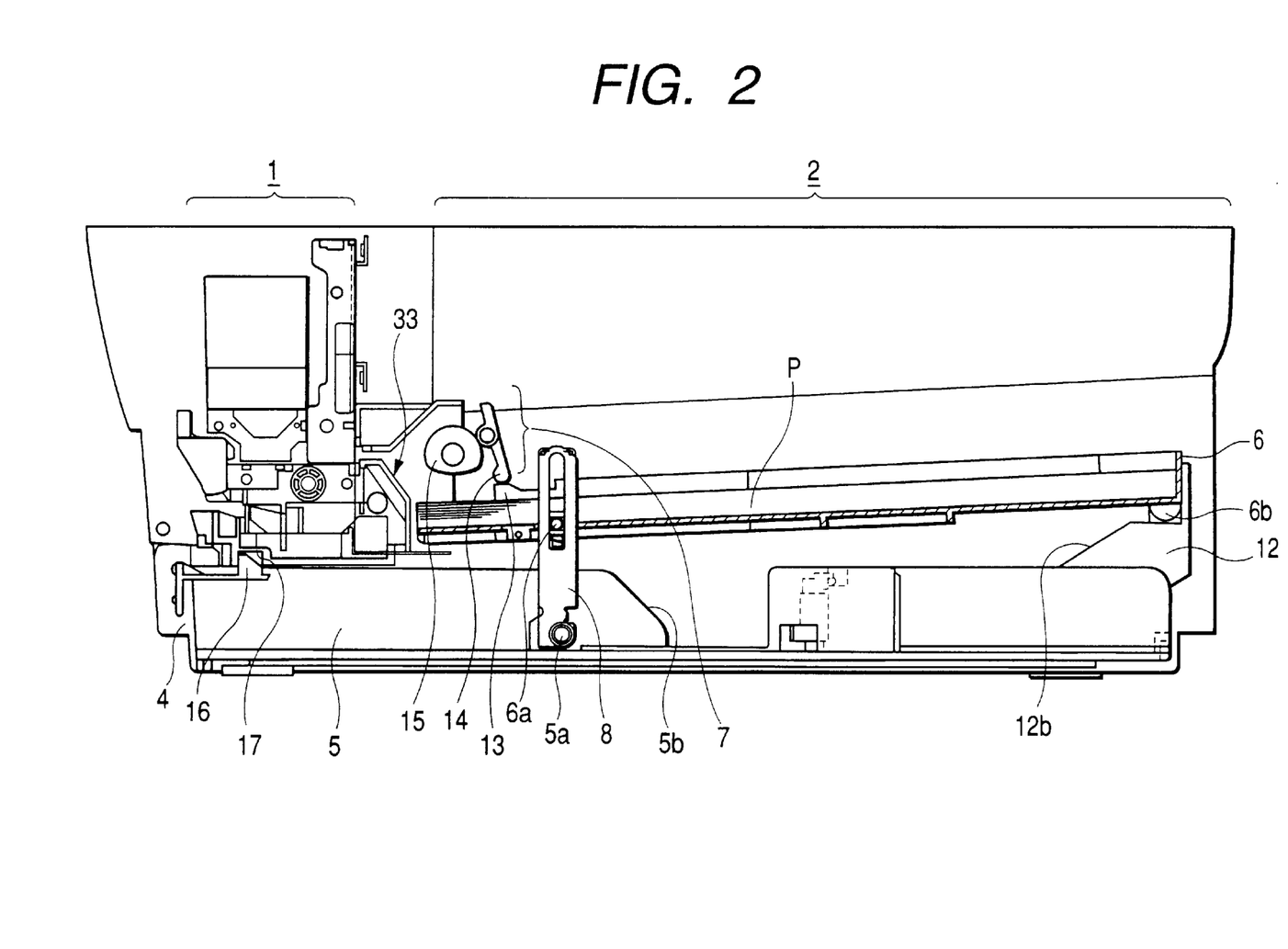
FIG. 2 is a cross-sectional view showing the MFP in a state in which the sheet cassette in the embodiment of the present invention has been set.

FIGS. 1 and 2 are cross-sectional views schematically showing the construction of MFP (multi-function peripheral) to which the present invention is applied, FIG. 1 showing a state in which a sheet cassette 3 has been pulled out of the main body of the apparatus, and FIG. 2 showing a state in which the sheet cassette 3 has been set in the main body of the apparatus.

A printer portion 1 is disposed in the front upper portion of the apparatus, and a scanner portion 2 is disposed rearwardly of the printer portion 1. Also, a sheet cassette insertion port 4 is provided in the front lower portion of the apparatus so that the sheet cassette 3 as sheet containing means can be inserted in the direction of arrow C from the front side.

The sheet cassette 3 is comprised of two main parts, i.e., a sheet cassette base 5 and a sheet tray 6 as sheet supporting means, and other small parts. In the state as shown in FIG. 1 wherein the sheet cassette 3 has been pulled out of the main body of the apparatus, the sheet cassette base 5 and the sheet tray 6 are insertable as a unit into the sheet cassette insertion port 4. On the other hand, in the state in which the sheet cassette 3 has been set in the apparatus, the sheet tray 6 is separated from the sheet cassette base 5 and is lifted in the apparatus as shown in FIG. 2 by the work of lift means which will be described later, and sheets P stacked on the sheet tray 6 are moved in a bundle to a substantially horizontal position on the rear side of the printer portion 1.

When the printer portion 1 performs the recording operation, a sheet feeding mechanism 7 as sheet feeding means provided in the rear portion of the printer portion 1 separates the sheets P one by one from the aforementioned bundle of sheets P and feeds them into the printer portion 1, and the sheets P on which recording has been done pass through the printer portion 1 and are discharged from the front face of the apparatus to the outside of the apparatus.

Although not shown, a printer controlling portion, a scanner controlling portion, an image processing portion, a power source portion, an operating panel portion, etc. are provided as an electric circuit portion, and the operating panel portion is disposed in the front upper portion of the printer portion 1.

With the above-described construction, the operation of the MFP can perform all of main operations such as the setting of the sheets onto the sheet cassette 3 to be effected before recording, the taking-out of the recorded sheets to be effected after recording, and the operation of the operating panel portion from the front side of the apparatus.

The construction of the sheet cassette 3 will now be described with reference to FIGS. 1 to 4. FIGS. 1 and 4 show the state in which the sheet cassette 3 has been pulled out of the main body of the apparatus.

The sheet tray 6 is discretely disposed on the tip fore end side of the sheet cassette base 5, and a guide shaft 6b slidable on a guide rail 12 is attached to the fore end of the sheet tray. The guide rail 12 is formed with an inclined surface 12b for raising the sheet tray 16 on the inner side of the main body of the apparatus.

The sheet cassette base 5 has shafts 5a at the right and left, and one end of a lift lever 8 as elastic means is pivotally mounted on each of these shafts 5a. The other ends of the lift levers 8 are connected to the sheet tray 6.

Figure 3:
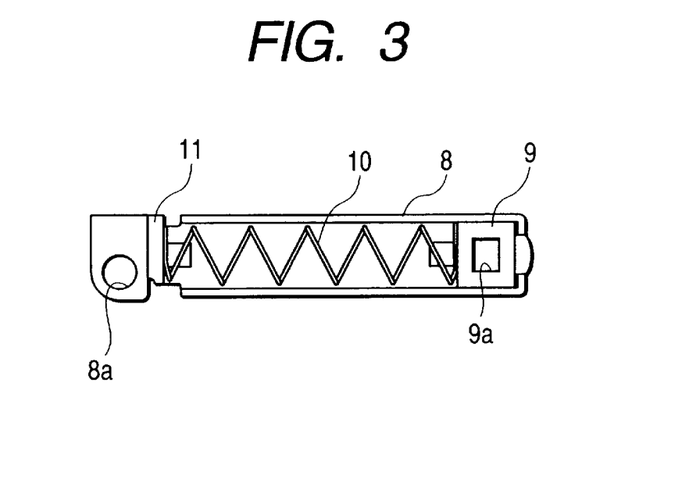
FIG. 3 shows the structure of a lift lever provided in the MFP shown in FIG. 1.
Figure 4:
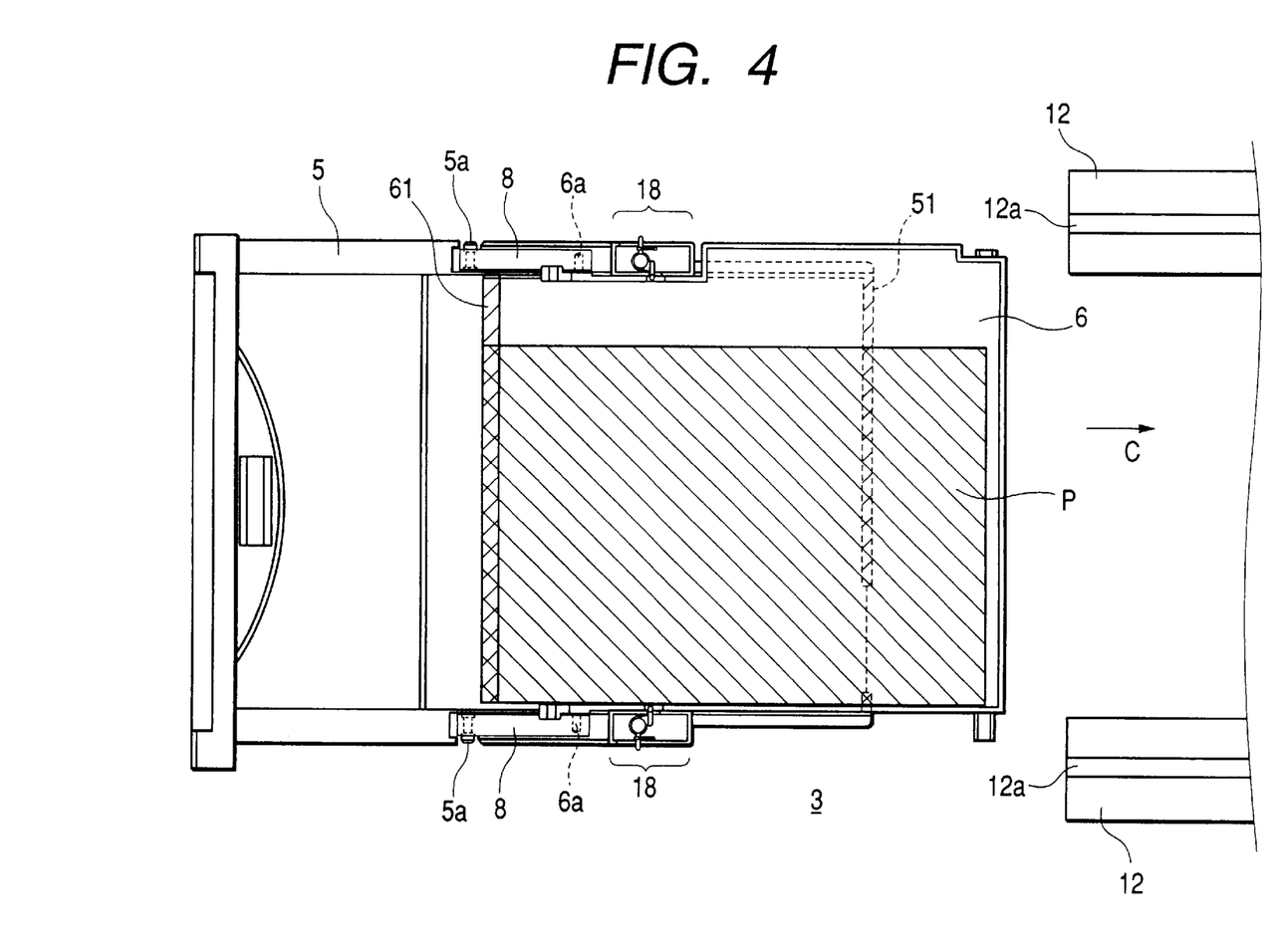
FIG. 4 is a plan view of the sheet cassette provided in the MFP shown in FIG. 1.

Each of the lift levers 8, as shown in FIG. 3, contains a lifter 9, a lifter spring 10 and a spring keep 11 therein, and the lifter 9 is rectilinearly movable in the lift lever 8 in the lengthwise direction thereof, and is urged toward the side connected to the sheet tray 6 by the lifter spring 10. Further, a hole 8a for passing the shaft of the sheet cassette base 5 therethrough is formed in that end portion connected to the sheet cassette base 5 which is opposite to the end portion toward which the lifter 9 is urged. Also, the lifter 9 has a hole 9a for supporting the sheet tray 6.

The sheet tray 6 has shafts 6a at the right and left, and is disposed on the sheet cassette base 5 with these shafts 6a passed into the hole 9a of the lifter 9. A part or the like for positioning the sheets stacked on the sheet tray 6 is mounted on the sheet tray 6, and this will be described later in detail.

Thus, the sheet tray 6 is lifted from the sheet cassette base 5 in response to the attachment thereof to the main body of the apparatus by the inclined surface 12a of the guide rail 12 and the construction of the lift levers 8. These constructions are defined as lift means.

The sheet cassette 3, as shown in FIG. 4, is provided with fixing means for fixing the sheet cassette base 5 and the sheet tray 6 in their horizontal states when it is pulled out of the main body of the apparatus. This fixing means has substantially symmetrical latch portions 18 at the right and left of the sheet cassette base 5.

Figure 5:
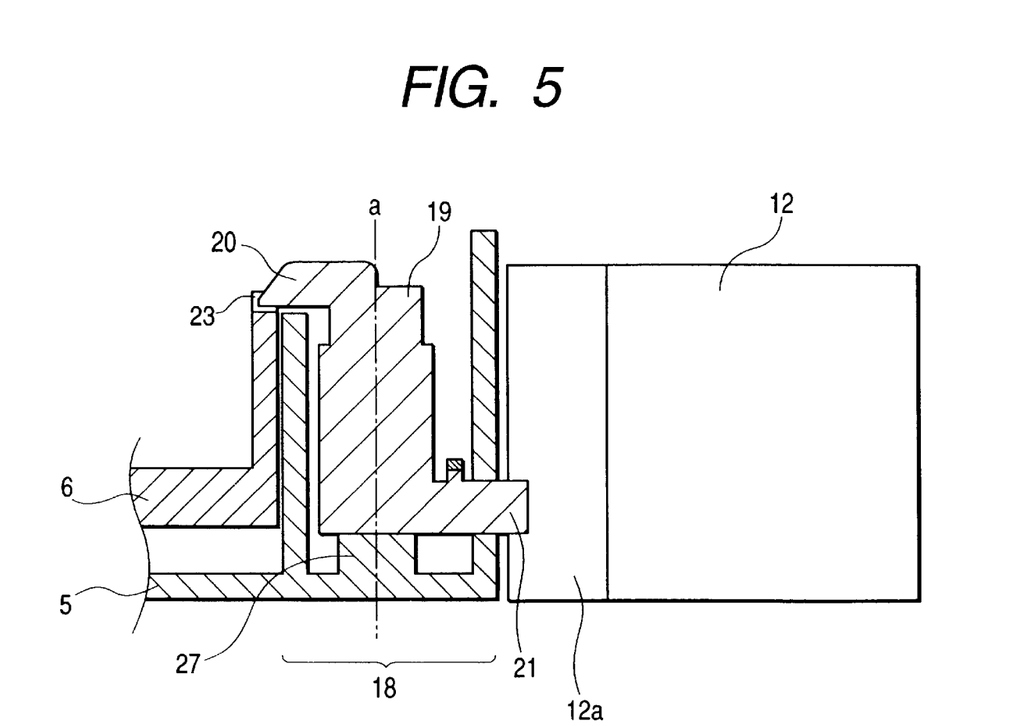
FIG. 5 is a cross-sectional view of a latch portion provided in the MFP shown in FIG. 1.

Here, the details of one side of these latch portions 18 will be described with reference to FIGS. 5, 6 and 7. FIG. 5 shows a cross-sectional view of the latch portion shown in FIG. 4, and FIGS. 6 and 7 show the structure of the latch portion shown in FIG. 4.

Figure 6:
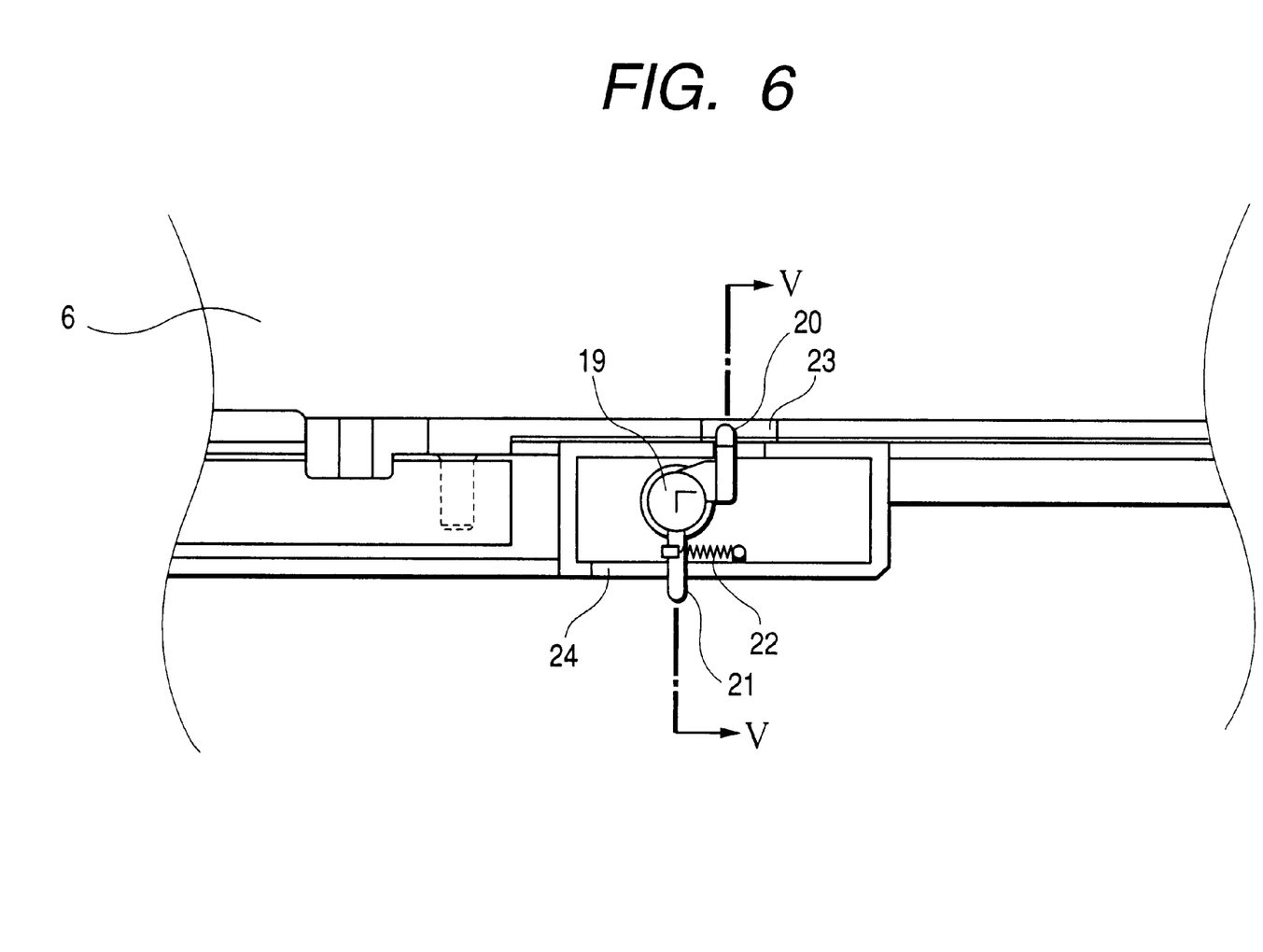
FIG. 6 shows the structure of the latch portion provided in the MFP shown in FIG. 1.
Figure 7:
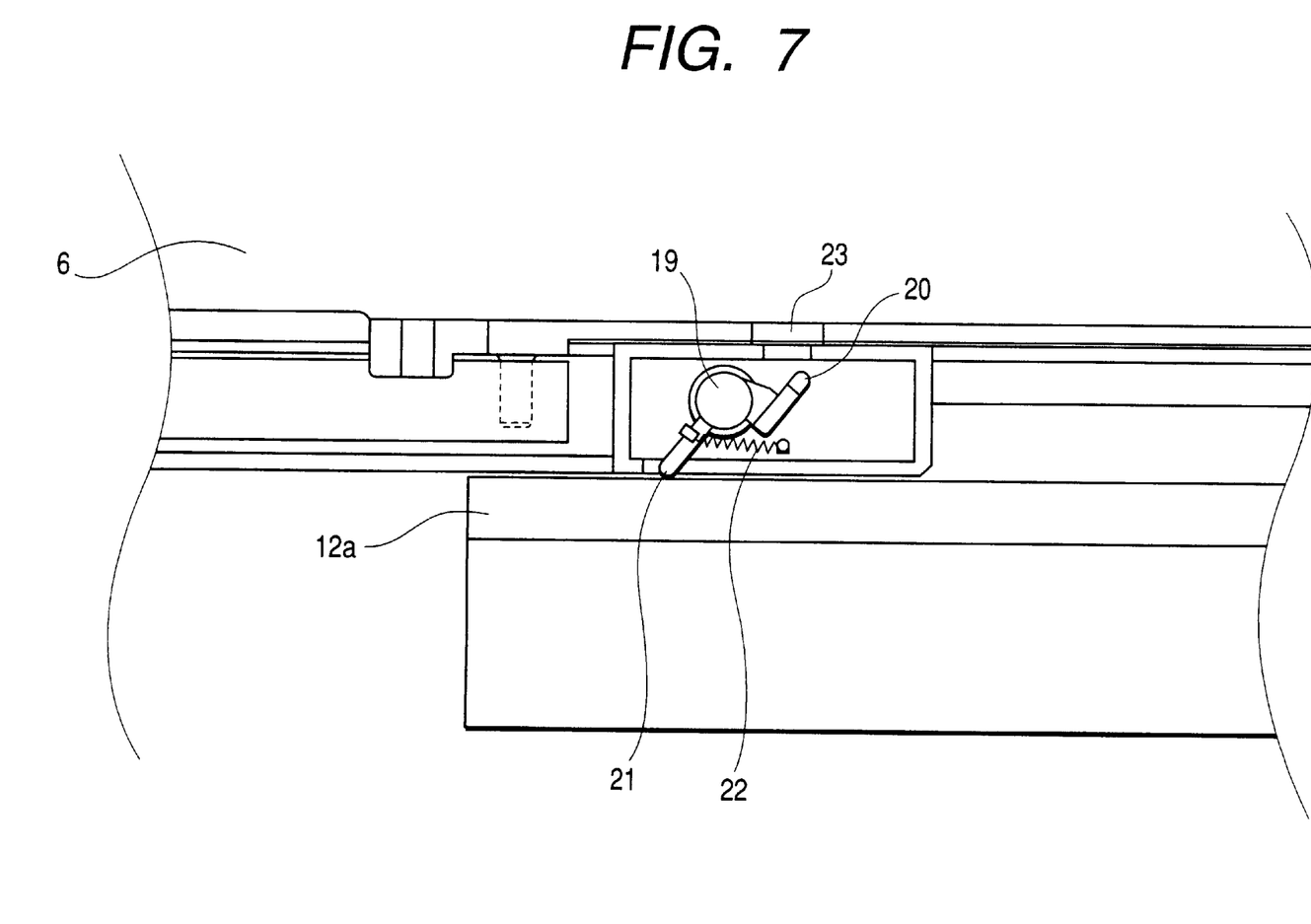
FIG. 7 shows the structure of the latch portion provided in the MFP shown in FIG. 1.

FIG. 5 is a cross-sectional view of the latch portion 18 in the state as shown in FIG. 1 wherein the sheet cassette 3 has been pulled out taken along the direction V—V indicated in FIG. 6, FIG. 6 shows the structure of the latch portion 18 in the state as shown in FIG. 1 wherein the sheet cassette 3 has been pulled out, and FIG. 7 shows the structure of the latch portion 18 in the state as shown in FIG. 2 wherein the sheet cassette 3 has been attached to the main body of the apparatus.

As shown in the cross-sectional view of FIG. 5, a latch 19 is fitted to a long latch shaft 27 which is a shaft extending in a direction substantially perpendicular to the horizontal plane of the sheet cassette base 5, and is pivotally movable about a rotary axis a.

Also, the latch 19 has two projected portions, i.e., a latch projection (inner) 20 as a first projected portion, and a latch projection (outer) 21 as a second projected portion, and these projected portions protrude from the latch portion.

This protruding state is maintained whenever the sheet cassette 3 is pulled out and therefore, as shown in FIG. 6, the latch 19 is biased by a latch spring 22 as latch holding means.

In this case, as shown in FIG. 6, the latch projection (inner) 20 is engaged with the latch engagement portion 23 of the sheet tray 6, and the latch projection (outer) 21 is contained in a containing hole 24, and the latch projection (inner) 20, as shown in FIG. 4, is located between the front portion 61 of the sheet tray and the rear portion 51 of the sheet cassette base with respect to the direction of insertion C of the sheet cassette and therefore regulates an operation in a direction substantially perpendicular to a plane substantially horizontal to the sheet tray 6.

Further, the sheet tray 6 is regulated with respect to the direction of insertion C of the sheet cassette by the lift levers 8, and in the opposite direction, it abuts against a portion (not shown) of the sheet cassette base 5, and on the plane of the sheet tray 6, in a direction perpendicular to the direction of insertion C of the sheet cassette, the sheet tray 6 has also its opposite ends regulated by the sheet cassette base 5. From such regulation, the sheet tray 6 is fixed relative to the sheet cassette base 5, and the unification of the two is realized.

Also, in this case, the latch projection (outer) 21 protrudes from the outer wall of the sheet cassette 3, and is adapted to strike against the rail wall 12a of the rail 12 provided in the apparatus as shown in FIG. 5 when the sheet cassette 3 is inserted in the direction of insertion C of the sheet cassette. Thus, this rail wall 12a plays the role of a pushing portion.

On the other hand, when the sheet cassette 3 is contained, a state as shown in FIG. 7 is brought about. FIG. 7 shows a state in which the sheet cassette 3 has been inserted into the sheet cassette insertion port 4 of the main body of the apparatus and the latch projection (outer) 21 protruding from the sheet cassette 3 has come to strike against the rail wall 12a of the guide rail 12.

As previously described, the latch 19 is rotatable, and by the rotation thereof, the latch projection (inner) 20 comes into the inside of the latch portion 18, and the fixing of the sheet tray 6 to the sheet cassette base 5 is released, and the sheet tray 6 simply becomes movable in a direction substantially perpendicular to the horizontal plane of the sheet tray 6.

Thus, according to an embodiment of the sheet cassette and the image forming apparatus according to the present invention, even if the sheet cassette 3 is provided with the sheet cassette base 5 and the sheet tray 6, the latch 19 provided in the latch portion 18 suppresses the vertical movement of the sheet tray 6 by the fixing means when the sheet cassette 3 is pulled out, and releases the suppression of the vertical movement of the sheet tray 6 when the sheet cassette 3 is contained and therefore the sheet cassette base 5 and the sheet tray 6 can be integrally handled in the sheet cassette 3 and thus, the sheet cassette 3 is not bulky and the handling property thereof can be improved.

Since in the present embodiment, the latch portions 18 are provided at the right and left of the sheet cassette base 5, the integrality of the sheet cassette base 5 and the sheet tray 6 can be made better.

Figure 8:
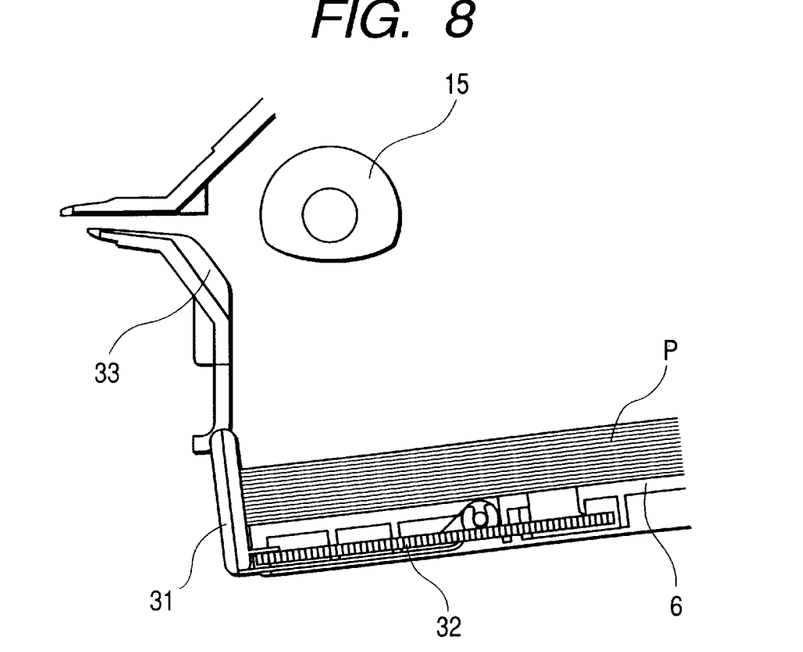
FIG. 8 shows the manner in which a sheet holding plate provided in the MFP shown in FIG. 1 regulates sheets supported on a sheet tray.
Figure 9:
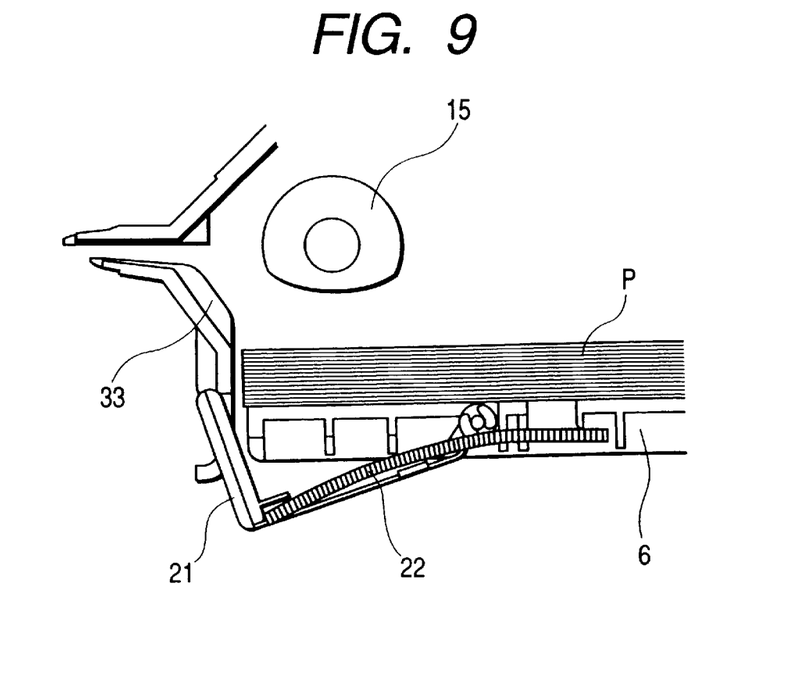
FIG. 9 shows the manner in which the sheet holding plate provided in the MFP shown in FIG. 1 releases the regulation of the sheets supported on the sheet tray.

Further, the sheet cassette 3 is provided with sheet holding means for improving the reliability of the operation during the stacking of the sheets P onto the sheet tray 6 and the insertion of the sheet cassette 3, and this sheet holding means will now be described with reference to FIGS. 8 and 9. FIGS. 8 and 9 are enlarged longitudinal cross-sectional views of a sheet holding plate 31 when incorporated into the sheet tray 6.

The sheet holding plate 31 is substantially L-shaped when viewed sideward, and has one end pivotally mounted on the sheet tray 6, and further is supported by a holding plate supporting spring 32 as biasing means and therefore, is usually in a state in which the other end thereof protrudes from the front edge to the upper portion of the sheet tray 6. It is preferable that this holding plate supporting spring 32 be formed by a coil spring, but an elastic member such as rubber or other spring than the coil spring can also be used as the holding plate-supporting spring.

Accordingly, when the sheets P stacked on the sheet tray 6 try to move forwardly of the apparatus, the sheets P strike against the sheet holding plate 31 and are stopped thereby. In this case, most of a force the sheet holding plate 31 receives from the sheets P is applied in a diametral direction relative to the locus of rotation of the sheet holding plate 31 and therefore, the sheet holding plate 31 blocks the movement of the sheets P without escaping.

This state is maintained even when as shown in FIG. 1, the sheet tray 6 is in its forwardly bended (anteverted) posture in the course of the operation of inserting the sheet cassette 3 into the apparatus, and the sheet tray 6 can be lifted while the sheets P are reliably held.

As the sheet tray 6 is lifted, the locus of the fore end of the sheet tray 6 passes the vicinity of the sheet feeding mechanism 7 and the sheets P are pushed up, but the fore end portion of the sheet holding plate 31 lies forwardly of the fore end of the sheet tray 6 and therefore, dashes against a dashing portion 33 provided in the sheet feeding mechanism 7 as an engagement portion, as shown in FIG. 9. At this time, the sheet holding plate 31 receives a force circumferentially of the movement locus thereof and is therefore rotated by a light load while flexing the holding plate supporting spring 32, and does not hamper the lift of the sheet tray 6.

Also, the place against which the fore end of the sheet holding plate 31 dashes is at a position higher than the lowest end of the sheet feeding mechanism 7. Accordingly, at a point of time whereat the sheet holding plate 22 begins to escape, the sheets P are already lifted to a position in which they are held by the sheet feeding mechanism 7 and therefore, the mounting of the sheet cassette 3 is completed without being deviated.

The sheet holding plate 31 intactly continues to retract also during the sheet feeding operation and therefore does not hinder the sheet feeding operation.

The holding plate supporting spring 32 is a closely wound elongate coil spring which utilizes the elasticity of the coil relative to the bending of the coil in the lateral (diametral) direction thereof.

Thereby, it is possible to maintain a light load over the full range of movement of the sheet holding plate 31 and moreover, the space required for mounting may be very small.

As described above, in the state in which the sheet cassette 3 has been pulled out of the apparatus and the state in which the sheet cassette 3 is being inserted into the apparatus, the sheets P can be held by the sheet holding plate 31 without slipping down from the sheet tray 6, and a mechanism which does not hamper the sheet feeding operation in the state in which the sheet cassette 3 has been mounted can be realized almost without affecting the size of the apparatus such as the thickness of the sheet tray 6 and therefore, operability and reliability can be improved and yet the apparatus can be realized at low costs with the complication of the apparatus avoided.

Description will now be made of the operation of attaching and detaching the sheet cassette 3 to and from the main body of the apparatus.

In the state of FIG. 1, the sheet cassette 3 is such that the sheet cassette base 5 and the sheet tray 6 are uniformly arranged in a horizontal direction, and the level of the sheet cassette 3 becomes lower than the opening level of the sheet cassette insertion port 4 and therefore, the sheet cassette 3 can be reasonably inserted into the sheet cassette insertion port 4.

Figure 10:
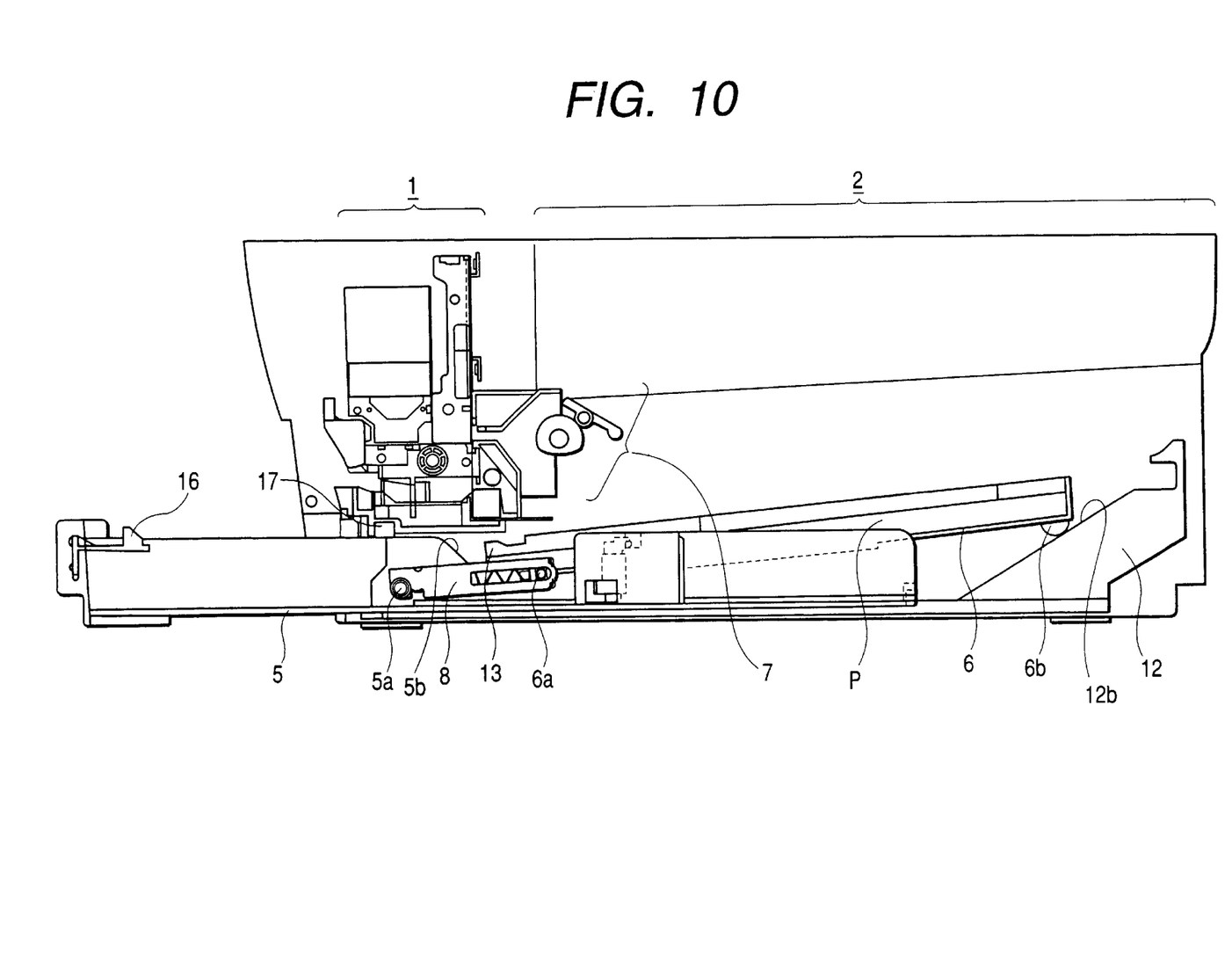
FIG. 10 shows the operation of attaching the sheet cassette in the MFP shown in FIG. 1.
Figure 11:
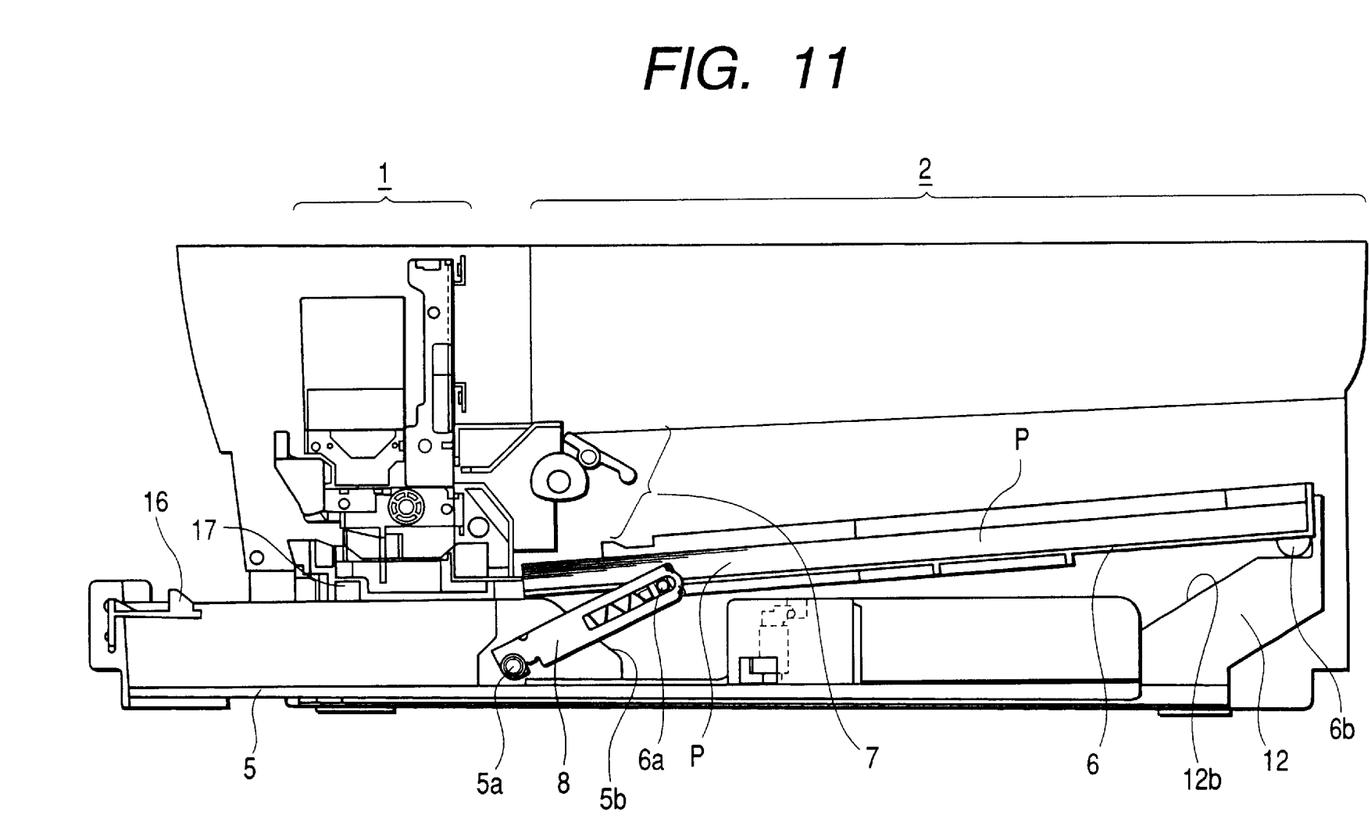
FIG. 11 shows the operation of attaching the sheet cassette in the MFP shown in FIG. 1.

FIGS. 10 and 11 show the state in the course of the operation of inserting the sheet cassette 3 into the apparatus through the sheet cassette insertion port 4. As the sheet cassette 3 is inserted, the guide shaft 6b provided in the rear portion of the side of the sheet tray 6 is guided by the guide rail 12 as first guide means provided in the apparatus, and is lifted from the apparatus rear side (the fore end portion) of the sheet tray 6.

When the guide shaft 6b of this sheet tray 6 arrives at the apparatus rear end of the guide rail 12, the sheet tray 6 cannot be moved any further rearwardly of the apparatus and the apparatus rear side of the sheet tray 6 is positioned. When the sheet cassette 3 continues to be inserted further, the sheet cassette base 5 is further advanced in a horizontal direction and the lifter spring 10 of the lifter 9 is compressed, and the apparatus front side (the rear end portion) starts to be lifted along the inclined surface 5b as second guide means provided on the sheet cassette base 5 and the sheet tray 6 is relatively moved on the sheet cassette base 5.

As the sheet tray 6 is moved up on the inclined surface 5b of the sheet cassette base 5, the lift levers 8 have their lengthwise direction pivotally moved from a horizontal direction to a vertical direction about the shafts 5a of the sheet cassette base 5. Further, when the lengthwise direction of the lift levers 8 approximates verticality, the vertical component force of the elastic force of the compressed lifter spring 10 overcomes the weight of the sheet tray 6 and the lifter 9 acts to push up the sheet tray 6.

When the cassette 3 has been pushed into the apparatus by a predetermined amount, the cassette base 5 dashes against a stopper, not shown, provided in the apparatus and comes not to enter any further. At the same time, a latch mechanism 16 provided on the sheet cassette base 5 in order to prevent the sheet cassette 3 from being pulled out by mistake is caught in a recess 17 formed in the main body of the apparatus and at this point of time, the operation of inserting the sheet cassette 3 is completed.

At this time, the lengthwise direction of the lift levers 8 is fixed in a vertical or nearly vertical predetermined direction, and the sheet tray 6 has its apparatus rear side supported by the guide rail 12 and has its apparatus front side supported by the lifter spring 10 through the lifter 9, and raises the sheets P to the sheet feeding mechanism 7 of the printer portion 1.

By the sheet cassette 3 being thus pushed into the main body of the apparatus, the sheet tray 6 is automatically lifted by the lift means and is maintained in a position in which it can feed out the sheets contained therein by the sheet feeding mechanism 7.

In this manner, a part of the force which pushes in the sheet cassette 3 is converted into a force which lifts the sheet tray 6 and therefore, it is not necessary to perform the operation for specially lifting the sheet tray 6.

The operation of the sheet feeding mechanism 7 will now be described with reference to FIGS. 6 and 7. In the sheet tray 6 lifted by the lifter 9, a cam 13 provided in the apparatus forward portion of the upper portion of the sheet tray 6 dashes against a release lever 14 provided in the sheet feeding mechanism 7.

Figure 12:
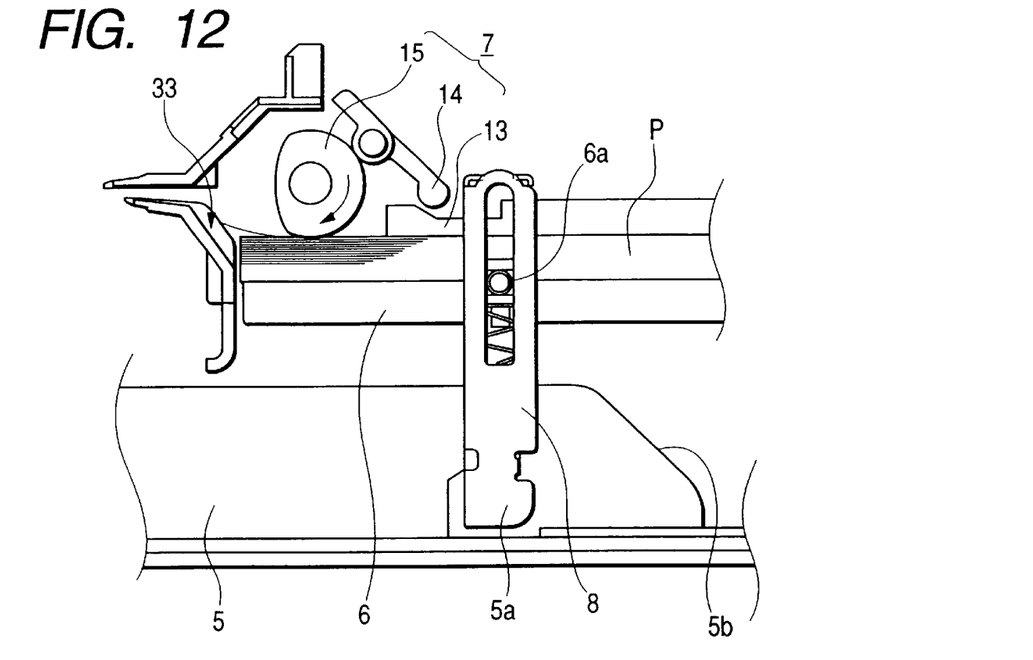
FIG. 12 shows the sheet feeding operation by the sheet feeding means of the MFP shown in FIG. 1.

The release lever 14 is adapted to operate in operative association with a feed roller 15, and in an initial state, it stops the lift of the sheet tray 6 at a position whereat the sheets P stacked on the sheet tray 6 do not contact with the feed roller 15.

When the feeding operation is started, the feed roller 15 begins to be rotated, and in synchronism therewith, the release lever 14 is released and therefore, the sheet tray 6 is lifted by the force of the lifter spring 10 and urges the sheets P against the feed roller 15.

The feed roller 15 further continues its rotation and feeds out the sheets P forwardly in the apparatus by the friction of the outer peripheral portion thereof, and at this time, only the uppermost sheet is separated from the bundle of the sheets P by separating means such as a separation claw, not shown, and is fed into the interior of the printer portion 1.

Accordingly, it is necessary that the elastic force of the lifter spring 10 be selected within a range suitable for raising the sheet tray 6, the sheets P stacked thereon, etc., urging the sheets P against the feed roller 15, and separating and feeding the sheets P.

Figure 13:
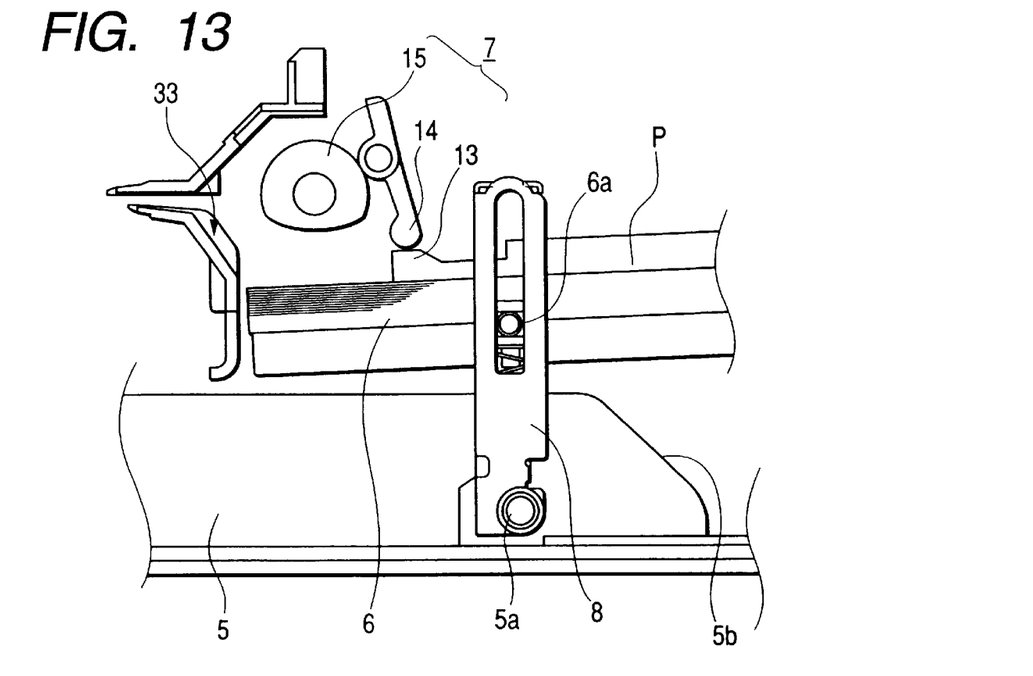
FIG. 13 shows the termination of the sheet feeding operation by the sheet feeding means of the MFP shown in FIG. 1.

When the feed roller 15 is further rotated, the release lever 14 is operated to depress the cam 13 of the sheet tray 6 and space the sheets P apart from the feed roller 15. At a point of time whereat the feed roller 15 and the release lever 14 have been returned to their initial positions, the feeding operation is terminated.

The sheet P fed from the rear of the apparatus to the printer portion 1 by the above-described feeding operation has image information recorded thereon while passing through the printer portion 1, and is discharged to the front portion of the apparatus.

As the image information recorded, utilization can be made of information sent from an external (outside) apparatus such as a computer and in addition, and information inputted from the scanner of the scanner portion 2 carried in the apparatus and processed by an image processing portion also carried in the apparatus and therefore, even if the outside apparatus is not connected, the copying function or the like can be realized by stand alone and the apparatus can be easily utilized even by utilizers unaccustomed to the use of information instruments.

As described above, the sheet tray 6 is lifted in the main body of the apparatus and is positioned with the printer portion 1 and therefore, the uppermost one of the stacked sheets is fed rectilinearly in the horizontal direction and is intactly discharged to the front side of the apparatus. Also, since the lift levers 8 bias the sheet tray 6 toward the feed roller 15, the sheet tray 6 is accurately positioned and other mechanism for biasing the sheet tray 6 becomes unnecessary and a reduction in cost and the simplification of the construction can be achieved.

All operations such as the sheet feeding by the attachment and detachment of the sheet cassette 3 and the setting and control of the printer portion 1 and the scanner portion 2 can be performed on the front side of the apparatus and therefore, the handling of the apparatus is simple and the operability of the apparatus is improved. Also, the conveying path of the sheets is substantially straight and the frequency of occurrence of so-called jam is reduced, and even when jam occurs, the removal of the jammed sheet can be easily done from the front side of the apparatus and thus, the working property is improved.

As described above, the present invention is of a simple construction in which the stacked sheets in the sheet cassette can be lifted and mounted and at the same time, the stacked sheets can be biased toward the feeding means and therefore, cost is low and sheet jam or the like does not occur and reliability is high, and compactness can be achieved. Also, all operations can be performed from the front side of the apparatus and the operability of the apparatus is good.

While in the foregoing description, the MFP has been described as an example of the image forming apparatus to which the present invention is applied, the image forming apparatus to which the sheet cassette according to the present invention and the image forming apparatus according to the present invention are applied is not restricted to such an MFP, but the present invention can also be applied, for example, to a printer, a copier, a scanner and a compound machine in which these are arbitrarily combined together.

What is claimed is:

1. A recording apparatus provided with recording means for effecting recording on a sheet, comprising:

sheet containing means detachably attached to a main body of said apparatus;

sheet supporting means disposed in said sheet containing means, for supporting the sheet;

first guide means provided in the main body of said apparatus, for lifting a tip end portion in an attachment direction of said sheet supporting means from said sheet containing means in operative association with an operation of attaching said sheet containing means to the main body of said apparatus;

second guide means provided in said sheet containing means, for lifting a rear end portion of said sheet supporting means by the operation of attaching said sheet containing means; and sheet feeding means for feeding the sheet from said sheet supporting means lifted by said first guide means and said second guide means toward said recording means.

2. A recording apparatus according to claim 1, wherein said sheet supporting means supports the sheet, and is lifted to a position substantially horizontally in line with said recording means in operative association with the operation of attaching said sheet containing means to the main body of said apparatus, and the sheet becomes suppliable to said recording means by said sheet feeding means.

3. A recording apparatus according to claim 2, wherein said recording means effects recording while substantially horizontally conveying the sheet fed out from said sheet supporting means, and discharges the recorded sheet to a front side of the main body of said apparatus.

4. A recording apparatus according to claim 1, wherein said sheet containing means includes said sheet supporting means and base means for supporting said sheet supporting means, and said second guide means includes elastic means disposed between said sheet supporting means and said base means, for biasing said sheet supporting means toward said sheet feeding means.

5. A recording apparatus according to claim 4, wherein said elastic means is compressed when said sheet containing means is attached to the main body of said apparatus, and biases said sheet supporting means toward said feeding means by an elastic force.

6. A recording apparatus according to claim 1, wherein said sheet containing means includes said sheet supporting means and base means for supporting said sheet supporting means, and said sheet containing means is provided with fixing means for fixing said sheet supporting means to said base means when said sheet containing means is pulled out of the main body of said apparatus.

7. A recording apparatus according to claim 6, wherein said fixing means releases the fixing of said sheet supporting means when said sheet containing means is attached to the main body of said apparatus.

8. A recording apparatus according to claim 7, wherein said fixing means has a latch mechanism for suppressing a movement of said sheet supporting means in a direction substantially perpendicular to said base means when said sheet containing means is pulled out of the main body of said apparatus, and releasing the suppression of the movement of said sheet supporting means in the direction substantially perpendicular to said base means when said sheet containing means is attached to the main body of said apparatus.

9. A recording apparatus according to claim 8, wherein said latch mechanism has a latch pivotally movable about a substantially vertical shaft provided in said base means, and said latch has a first projected portion adapted to follow the pivotal movement of said latch, and to be engaged with a cut-away portion provided on a side wall of said sheet supporting means to thereby suppress the movement of said sheet supporting means in the substantially perpendicular direction when said sheet containing means is pulled out, and by which said latch is pivotally moved by a predetermined angle to thereby release the engagement with said cut-away portion when said sheet containing means is attached, and a second projected portion adapted to follow the pivotal movement of said latch, and protruded to an outside of said base means when said sheet containing means is pulled out.

10. A recording apparatus according to claim 8, wherein said latch mechanism is provided on each of both side surfaces of said base means.

11. A recording apparatus according to claim 9, wherein when said sheet containing means is attached to the main body of said apparatus, a pushing portion provided in the main body of said apparatus pushes said second projected portion to thereby pivotally move said latch.

12. A recording apparatus according to claim 1, further comprising sheet holding means capable of holding the sheet supported by said sheet supporting means, said sheet holding means being movable to a position for holding the sheet and a position retracted from said position for holding the sheet, in conformity with a lifted state of said sheet supporting means by said lift means.

13. A recording apparatus according to claim 12, wherein said sheet holding means holds the sheet on said sheet supporting means so as to prevent a movement of the sheet in a direction in which the sheet is conveyed.

14. A recording apparatus according to claim 12, further comprising biasing means for biasing said sheet holding means into a state holding the sheet.

15. A recording apparatus according to claim 14, wherein said biasing means is a coil spring, and a biasing is done by elasticity to a bending of said coil spring in a diametral direction thereof.

16. A recording apparatus according to claim 1, wherein said recording means is of an ink jet type in which an ink is discharged from a nozzle to effect recording on the sheet.

17. A recording apparatus according to claim 1, further comprising image reading means for reading an image of an original.

18. A recording apparatus according to claim 17, wherein said image reading means is of a flat bed type and is provided on an upper surface of the main body of the apparatus.

19. A recording apparatus according to claim 17, wherein information inputted by said image reading means is information to be processed without the intermediary of an outside apparatus and be recorded on the sheet.

* * * * *

UNITED STATES PATENT AND TRADEMARK OFFICE
CERTIFICATE OF CORRECTION

PATENT NO. : 6,693,728 B1
DATED : February 17, 2004
INVENTOR(S) : Hiroyuki Kinoshita et al.

It is certified that error appears in the above-identified patent and that said Letters Patent is hereby corrected as shown below:

<u>Column 3,</u>
Line 65, "or" should read -- of --.

<u>Column 5,</u>
Line 46, "plate-supporting" should read -- plate supporting --.

Signed and Sealed this

Eighth Day of June, 2004

JON W. DUDAS
*Acting Director of the United States Patent and Trademark Office*